United States Patent
Bassi et al.

(10) Patent No.: US 9,429,222 B2
(45) Date of Patent: Aug. 30, 2016

(54) DRIVE UNIT ASSEMBLY

(71) Applicant: MERITOR HEAVY VEHICLE SYSTEMS CAMERI SPA, Cameri (IT)

(72) Inventors: Marco Bassi, Novate Milanese (IT); Roberto Gianone, Barengo (IT); Eugenio Tiziani, Cameri (IT)

(73) Assignee: Meritor Heavy Vehicle Systems Cameri SpA, Cameri (IT)

( * ) Notice: Subject to any disclaimer, the term of this patent is extended or adjusted under 35 U.S.C. 154(b) by 37 days.

(21) Appl. No.: 14/547,756

(22) Filed: Nov. 19, 2014

(65) Prior Publication Data

US 2015/0137586 A1    May 21, 2015

(30) Foreign Application Priority Data

Nov. 21, 2013    (EP) .................................... 13193917

(51) Int. Cl.
| | |
|---|---|
| *F16H 57/04* | (2010.01) |
| *F16H 57/037* | (2012.01) |
| *F16H 48/06* | (2006.01) |
| *B60K 17/36* | (2006.01) |

(52) U.S. Cl.
CPC ............. *F16H 57/037* (2013.01); *B60K 17/36* (2013.01); *F16H 48/06* (2013.01); *F16H 57/045* (2013.01)

(58) Field of Classification Search
None
See application file for complete search history.

(56) References Cited

U.S. PATENT DOCUMENTS

| | | | | |
|---|---|---|---|---|
| 2,033,246 | A * | 3/1936 | Keese .................... | B60K 17/36 180/22 |
| 2,295,213 | A * | 9/1942 | Holmstrom ............ | B60K 17/36 180/24.11 |
| 2,537,400 | A * | 1/1951 | Drong .................... | B60K 17/36 180/24.1 |
| 2,603,108 | A * | 7/1952 | Carlson .................. | B60K 17/36 180/22 |
| 2,870,854 | A | 1/1959 | Keese | |
| 4,325,450 | A | 4/1982 | Ward | |
| 4,754,847 | A * | 7/1988 | Glaze ..................... | B60K 17/16 184/6.12 |

(Continued)

FOREIGN PATENT DOCUMENTS

| | | |
|---|---|---|
| FR | 2345629 A1 | 10/1977 |
| JP | 6223824 A | 1/1987 |
| JP | 2004017734 A | 1/2004 |

OTHER PUBLICATIONS

European Patent Office, Search Report for the European Patent Application No. 13193917.5 mailed Mar. 28, 2014.

*Primary Examiner* — Dirk Wright
(74) *Attorney, Agent, or Firm* — Brooks Kushman P.C.

(57) ABSTRACT

A drive unit assembly including an input element, a first output element, a second output element and a drive unit housing containing a differential unit, the differential unit drivingly coupling the input element, the first output element and the second output element, the input element having input coupling features positioned externally of the drive unit housing, the first output element having output coupling features positioned externally of the drive unit housing, wherein the drive unit housing includes at least one mounting feature for securing the drive unit housing externally relative to an axle assembly and the second output element is suitable for driving an axle assembly.

20 Claims, 6 Drawing Sheets

(56) References Cited

U.S. PATENT DOCUMENTS

| | | | | |
|---|---|---|---|---|
| 5,404,963 A * | 4/1995 | Crepas | | F16C 17/04 184/11.2 |
| 6,514,169 B2 * | 2/2003 | Turner | | B60K 17/36 475/222 |
| 6,863,634 B2 * | 3/2005 | Holman | | B60K 17/36 180/24.12 |
| 6,884,196 B1 * | 4/2005 | Ziech | | B60K 17/16 475/230 |
| 7,211,017 B2 * | 5/2007 | Green | | B60K 17/16 192/85.18 |
| 7,258,641 B2 * | 8/2007 | Green | | F16H 57/0483 475/160 |
| 7,306,536 B2 * | 12/2007 | Ziech | | B60K 17/36 180/24.09 |
| 7,410,440 B2 * | 8/2008 | Garcia | | B60B 35/08 29/401.1 |
| 8,851,212 B2 * | 10/2014 | Kahl | | F16H 48/06 180/24.11 |
| 8,960,362 B2 * | 2/2015 | Barbir | | B62D 21/186 180/378 |
| 9,267,596 B2 * | 2/2016 | Trost | | F16H 57/045 |

\* cited by examiner

DRIVE UNIT ASSEMBLY

TECHNICAL FIELD

The present invention relates to drive unit assemblies, in particular drive unit assemblies for driving axles, in particular rear axles of vehicles, in particular heavy vehicles such as lorries and trucks.

BACKGROUND

Heavy vehicles, such as trucks and lorries, are known which have two rear axles, namely a forward-rear axle assembly and a rear-rear axle assembly. The rear-rear axle assembly is behind the forward-rear axle assembly. Each axle is a driven axle and includes a differential unit for driving the right and left wheels associated with that axle. Engine power is transmitted through a gear box or the like along a prop shaft to a front drive flange of the forward-rear axle assembly. Housed within the forward-rear axle assembly housing is an inter-axle differential unit which transfers power to both the forward-rear differential unit (also housed within the forward-rear axle assembly housing) and the rear-rear differential unit. Power is transmitted to the forward-rear differential unit via gears and the like within the forward-rear axle housing. Power is transmitted to the rear-rear differential unit via a shaft which is mainly housed within the forward-rear axle housing but projects rearwardly out of the forward-rear axle housing. A prop shaft or the like connects the shaft to a drive flange of the rear-rear axle housing.

As will be appreciated the forward-rear axle housing includes two differential units namely the inter-axle differential unit and the forward-rear differential unit. However, the rear-rear axle housing only includes a single differential unit, namely the rear-rear axle differential unit. Such an arrangement results in a forward-rear axle housing that necessarily must be larger (to accommodate the greater number of components) than the rear-rear axle housing which can be smaller. Consequently the forward-rear axle housing is different from the rear-rear axle housing. This in turn requires two sets of manufacturing components, and two different assembly lines for assembling the two different axle housings.

SUMMARY

According to a first aspect of the present invention there is provided a drive unit assembly including an input element, a first output element, a second output element and a drive unit housing containing a differential unit, the differential unit drivingly coupling the input element, the first output element and the second output element, the input element having input coupling features positioned externally of the drive unit housing, the first output element having output coupling features positioned externally of the drive unit housing, wherein the drive unit housing includes at least one mounting feature for securing the drive unit housing externally relative to an axle assembly having a differential carrier and an axle housing and wherein the second output element is suitable for driving an axle assembly.

According to a second aspect of the present invention there is provided an axle arrangement including a drive unit assembly having an input element, a first output element, a second output element and a drive unit housing containing a differential unit, the differential unit drivingly coupling the input element, the first output element and the second output element, the input element having input coupling features positioned externally of the drive unit housing, the first output element having output coupling features positioned externally of the drive unit housing, wherein the drive unit housing includes at least one mounting feature.

The axle arrangement may further include an axle assembly having an axle input element defined by a differential carrier, a right wheel output element, a left wheel output element and an axle housing containing a single axle differential unit, the single axle differential unit drivingly coupling the axle input element, the right wheel output element and the left wheel output element.

The drive unit housing may be secured to the axle assembly externally relative to the axle housing via the at least one mounting feature such that the second output element selectively drives the axle input element.

An axis of the input element may be coincident with an axis of the first output element. An axis of the input element may be parallel to an axis of the second output element. An axis of the first output element may be parallel to an axis of the second output element. An axis of the second output element may be coincident with an axis of the axle input element.

According to a third aspect of the present invention there is provided a vehicle including an axle arrangement including a drive unit assembly having an input element, a first output element, a second output element and a drive unit housing containing a differential unit, the differential unit drivingly coupling the input element, the first output element and the second output element, the input element having input coupling features positioned externally of the drive unit housing, the first output element having output coupling features positioned externally of the drive unit housing, wherein the drive unit housing includes at least one mounting feature.

The axle arrangement may further include an axle assembly having an axle input element defined by a differential carrier, a right wheel output element, a left wheel output element and an axle housing containing a single axle differential unit, the single axle differential unit drivingly coupling the axle input element, the right wheel output element and the left wheel output element.

The drive unit housing may be secured to the axle assembly externally relative to the axle housing via the at least one mounting feature such that the second output element selectively drives the axle input element, the axle arrangement defining a forward-rear axle arrangement of the vehicle and the differential carrier defining a forward-rear differential carrier.

The vehicle may include a rear-rear axle assembly positioned behind the forward-rear axle arrangement.

The rear-rear axle assembly may include a rear-rear differential carrier upon which is mounted a single rear-rear differential unit.

The forward-rear differential carrier may be substantially the same as the rear-rear differential carrier.

An axis of the right wheel output element may be coincident with the axis of the left wheel output element. An axis of the right wheel output element may be arranged laterally relative to an axis of the input element, and/or an axis of the first output element, and/or an axis of the second output element and/or an axis of the axle input element. An axis of the left wheel output element may be arranged laterally relative to an axis of the input element, and/or an axis of the first output element, and/or an axis of the second output element, and/or an axis of the axle input element.

The differential unit of the drive unit assembly may be an interaxle differential unit.

The drive unit assembly may define a first lubricant reservoir. The axle assembly may define a second lubricant reservoir separate from the first lubricant reservoir. The rear-rear axle assembly may define a third lubricant reservoir separate from the second lubricant reservoir and/or separate from the first lubricant reservoir.

BRIEF DESCRIPTION OF THE DRAWINGS

The invention will now be described, by way of example only, with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 6:
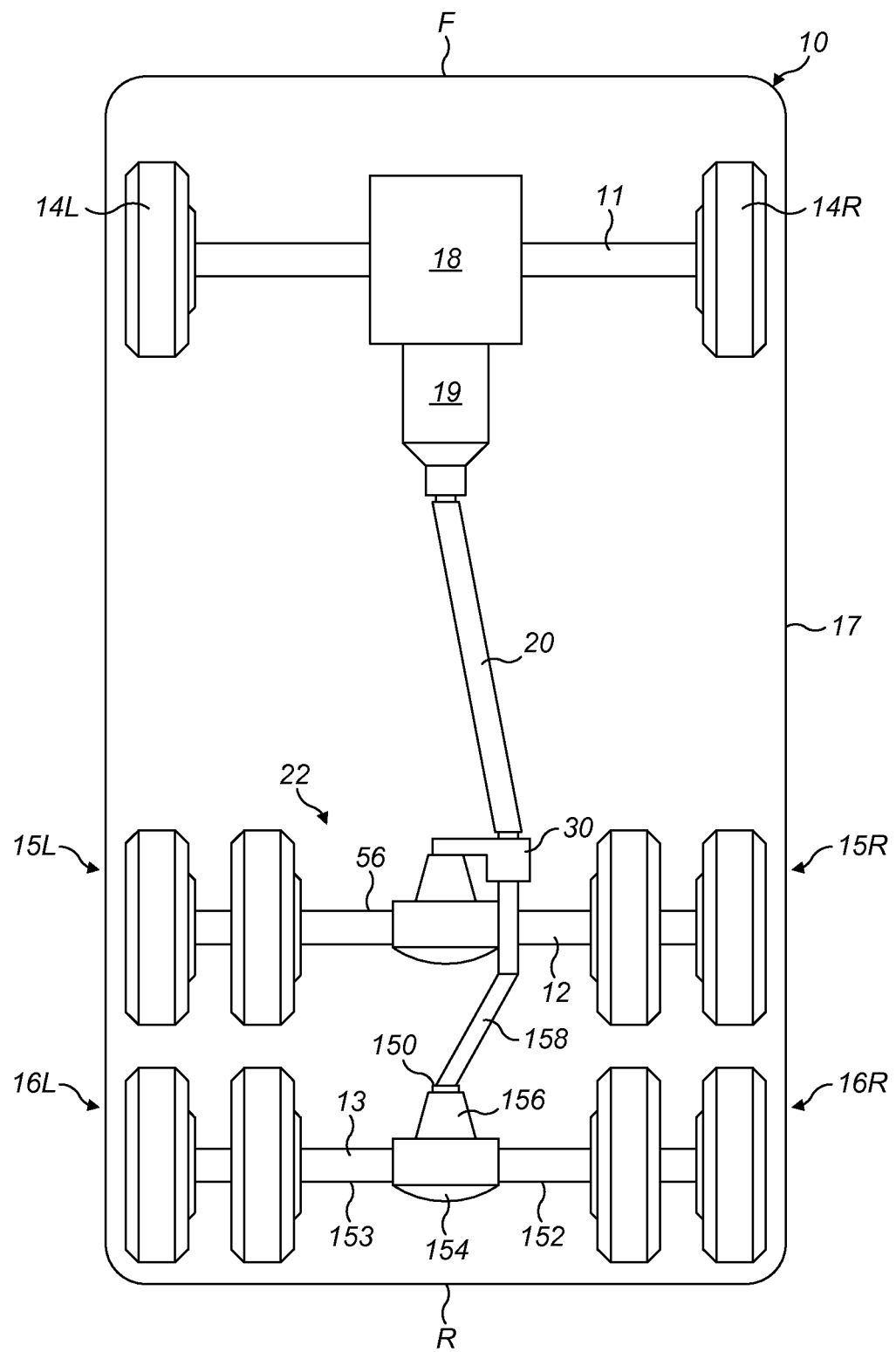
FIG. 6 is a schematic plan view of a vehicle including a drive unit assembly according to the present invention.

With reference to FIG. 6 there is shown a vehicle 10 having a front F and a rear R. The vehicle includes a front axle 11, a forward-rear axle assembly 12 and a rear-rear axle assembly 13. In this case, the front axle 11 is a non-driven axle and includes wheels 14L and 14R which are steerable. The forward-rear axle assembly includes a pair of right wheels 15R and a pair of left wheels 15L. The rear-rear axle assembly includes a pair of right wheels 16R and a pair of left wheels 16L. Each axle is mounted via suspension on a chassis 17. The forward-rear axle assembly 12 and rear-rear axle assembly 13 are driven axles. An engine 18 drives a gear box 19 which in turn drives a prop shaft 20. The prop shaft 20 is connected to a drive unit assembly 30 which selectively can drive both the forward-rear axle assembly and rear-rear axle assembly as will be described below.

With reference to FIGS. 1 to 5, there is shown in greater detail, the forward-rear axle assembly 12. As can be seen from FIG. 1, an axle arrangement 31 consists of the drive unit assembly 30 and the forward-rear axle assembly 12.

The drive unit assembly 30 includes a housing 32 which includes a front portion 33 shaped to receive components as will be further described below, and a rear portion 34 which is generally elongate and cylindrical. The housing 32 also includes a front cover 35 which generally closes an opening of the front portion 33.

Figure 1:
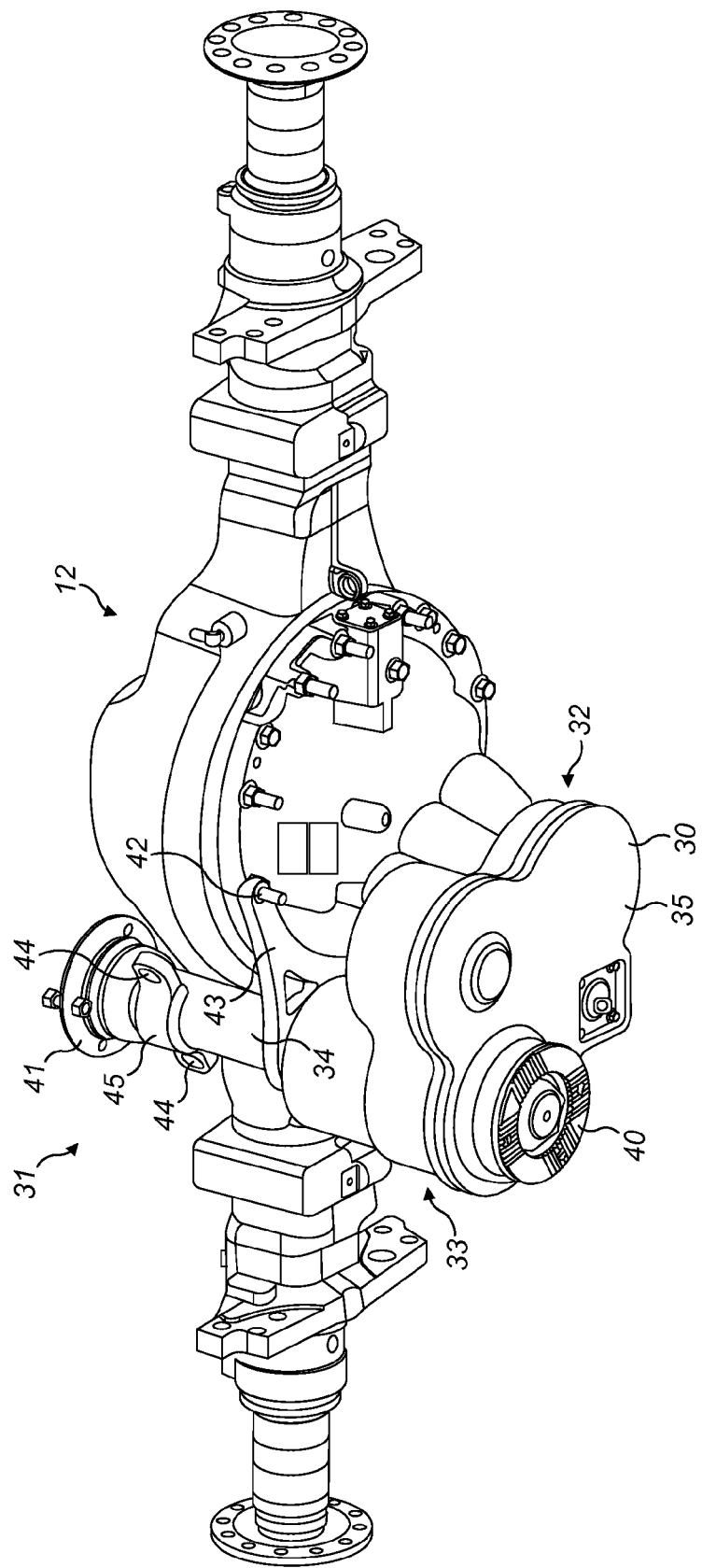
FIG. 1 is an isometric view of a drive unit assembly according to the present invention mounted on an axle assembly.
Figure 2:
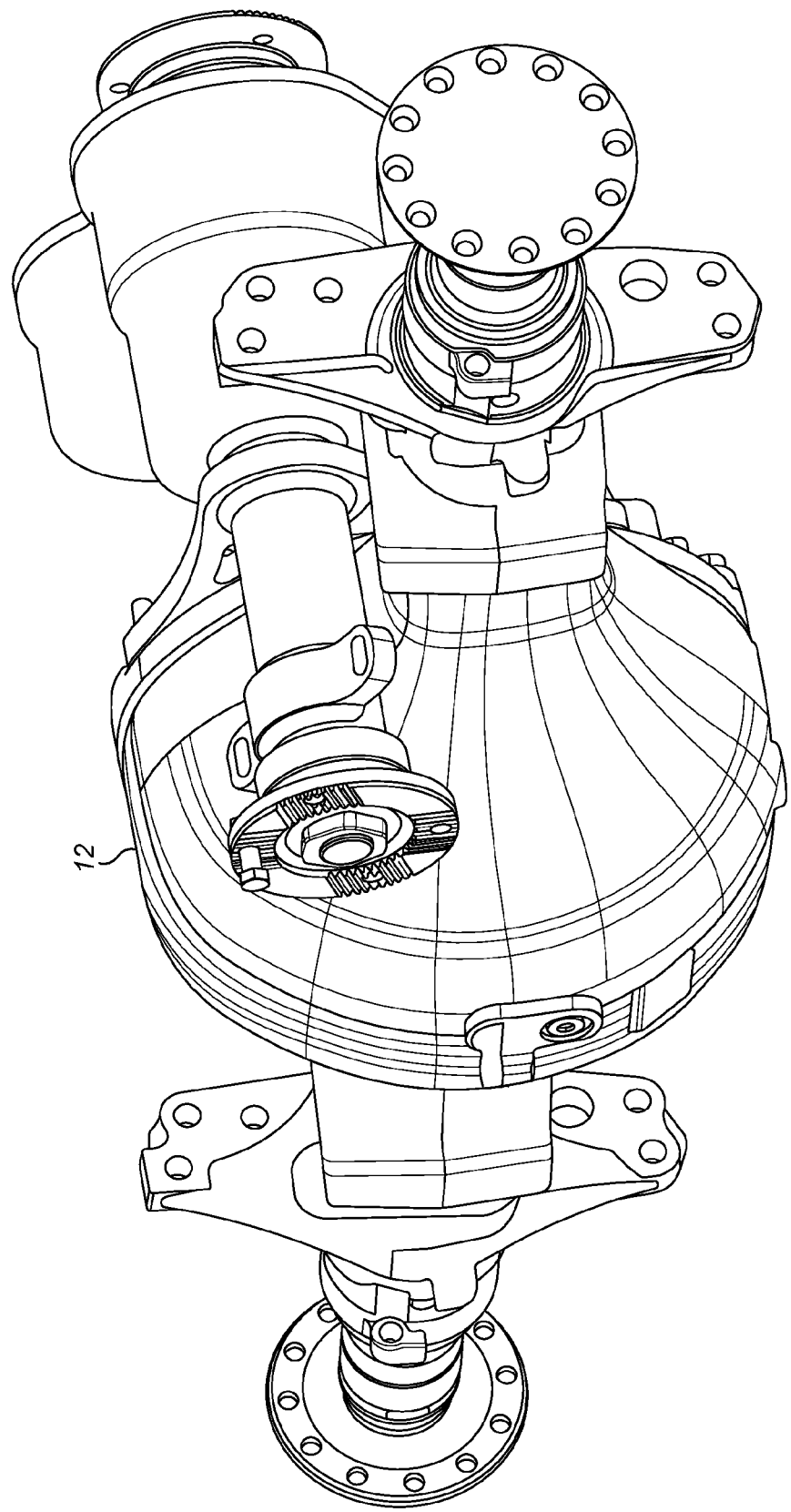
FIG. 2 is an alternate view of the components shown in FIG. 1.

As can be seen from FIG. 1 the drive unit assembly 30 includes an input element in the form of a drive flange 40 and a first output element in the form of a drive flange 41. As will be appreciated the drive flanges 40 and 41 are outside of the housing 32 as defined by the front portion 33, rear portion 34 and front cover 35.

The housing 32 further includes mounting features to enable the housing 32 to be mounted on the forward rear axle assembly 12. In this case the mounting features are defined by holes 42 (only one of which is shown) in mounting flange 43 and holes 44 in bracket 45. Both the mounting flange 43 and the bracket 45 are secured to the housing 32, for example by welding.

Figure 4:
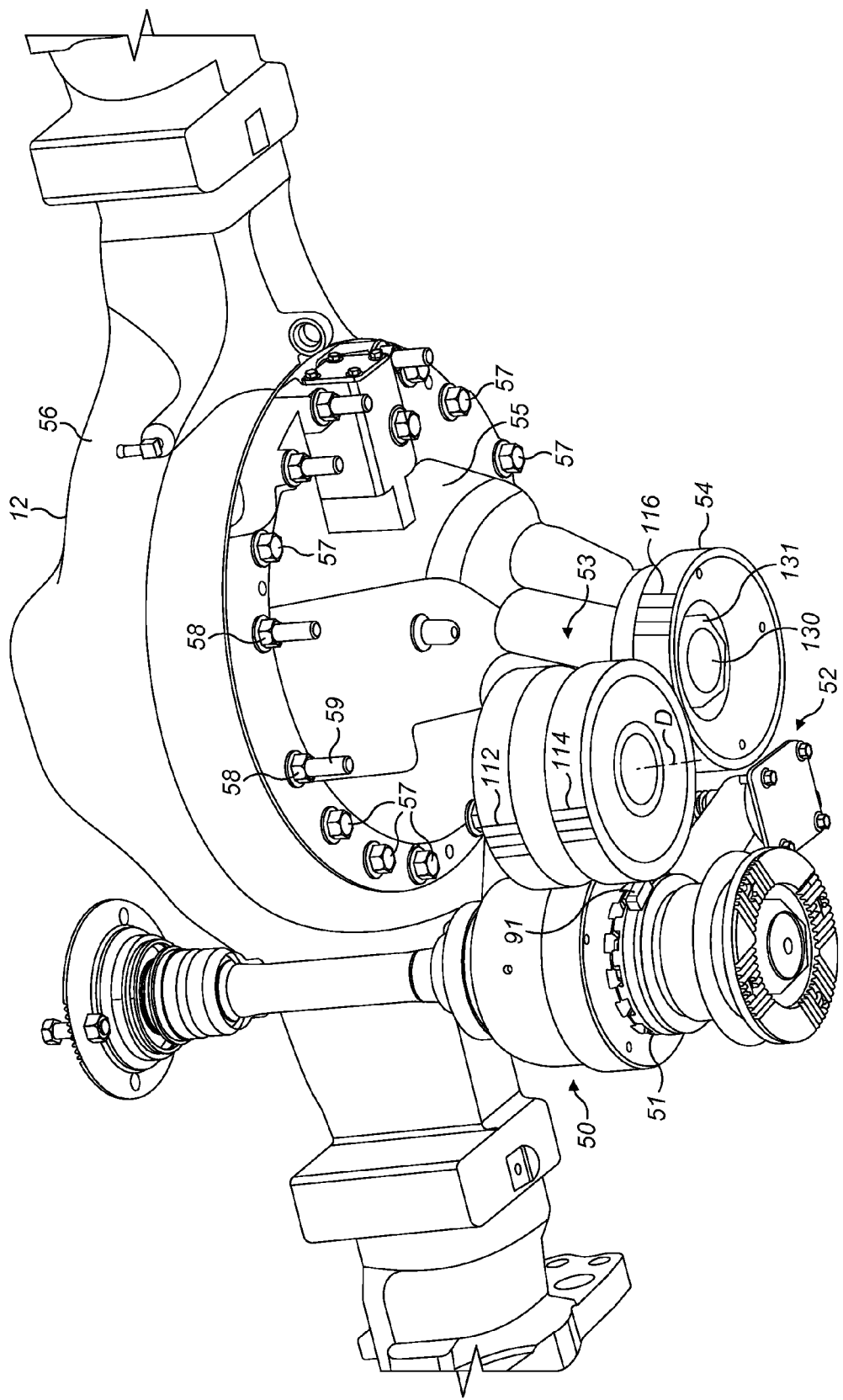
FIG. 4 is a view similar to FIG. 1 with the drive unit housing not shown.

As best seen in FIG. 4, the components which are contained within housing 32 are shown. They include an interaxle differential unit 50, a differential lock 51, a differential lock actuator 52, idler gear arrangement 53 and a second output element in the form of gear 54.

Figure 3:
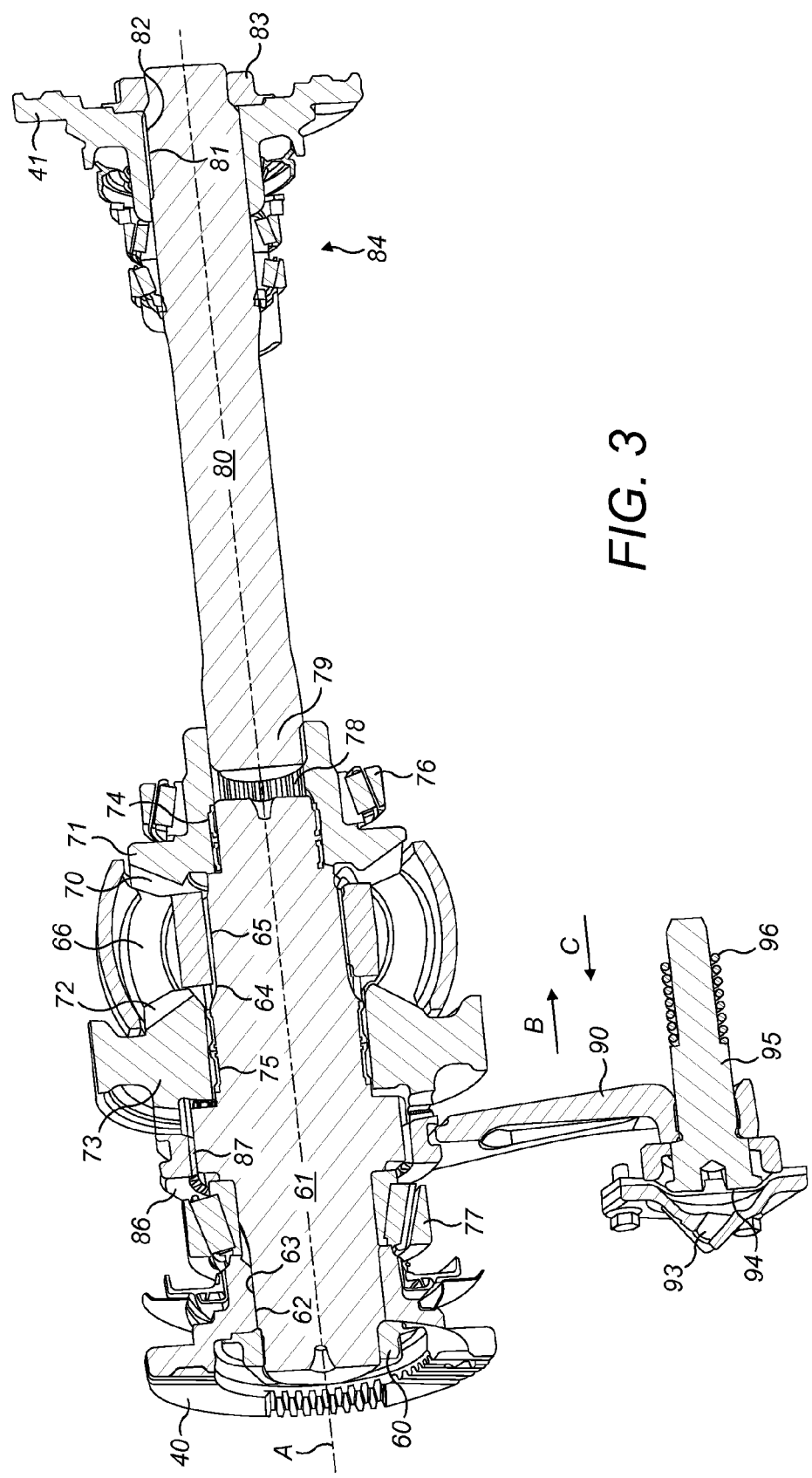
FIG. 3 is a cross-section of certain of the components of the drive unit assembly of FIG. 1.

Turning to FIG. 3, the drive flange 40 is secured by a nut 60 to input shaft 61. The drive flange 40 includes a bore having spline 62 which engage with splines 63 of the input shaft 61 to ensure that the drive flange 40 is rotatably fast with the input shaft 61. The input shaft 61 also includes splines 64 which engage with splines 65 of a differential spider 66. Spider gears mounted on spider 66 engage with the teeth 70 on gear 71 and also with teeth 72 on gear 73. The differential unit 50 therefore allows gear 71 and 73 to rotate at different speeds when required.

A bearing 74 allows gear 71 to rotate relative to the input shaft 61. A bearing 75 allows gear 73 to rotate relative to the input shaft 61. A bearing 76 is mounted in housing 32 to enable the gear 71 to rotate relative to the housing 32. A bearing 77 is mounted in housing 32 to enable the input shaft 61 to rotate relative to the housing. The gear 71 has a splined bore 78 within which sits a splined end 79 of an output shaft 80. The output shaft 80 has a further splined end 81 which is positioned in a splined bore 82 of the drive flange 41 to ensure that drive flange 41 is rotationally fast with the output shaft 80. A nut 83 secures the drive flange 41 onto the output shaft 80. A pair of taper roller bearings 84 is mounted in the housing 32 and enables the output shaft 80 to rotate relative to the housing.

The flange 40 rotates about a first axis A. The flange 41 also rotates about the first axis A.

A differential lock collar 86 is slideably mounted via spline 87 on the first shaft 61. The differential lock collar is therefore rotationally fast with the input shaft 61. The differential lock collar 86 includes a set of dog teeth 88 (see FIG. 5). The gear 73 also includes a set of dog teeth 89 which face dog teeth 88.

Figure 5:
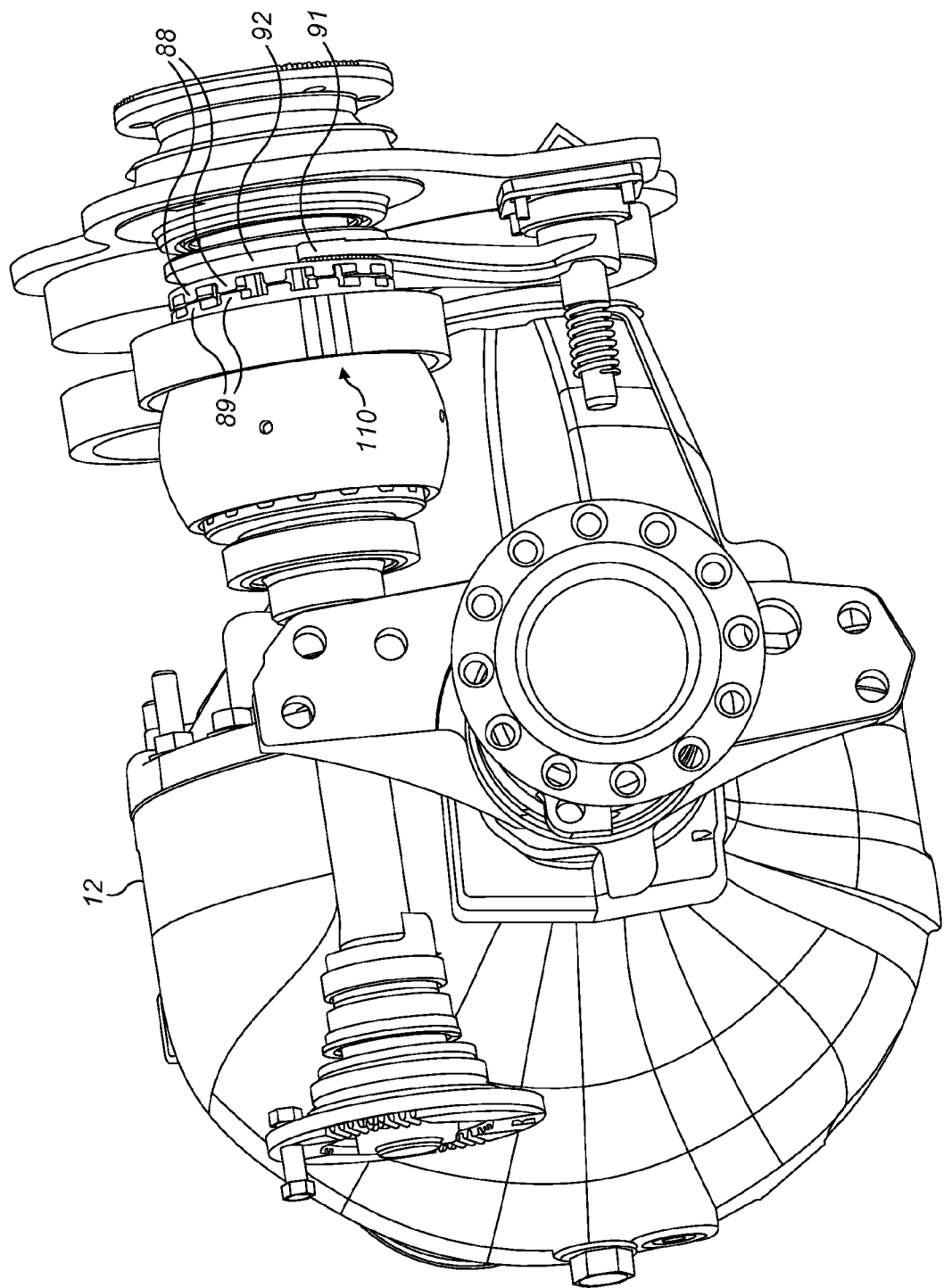
FIG. 5 is an alternate view of FIG. 4.

With the dog teeth 88 disengaged from dog teeth 89, as shown in FIG. 5, the gear 73 can rotate relative to the input shaft 61 as described above, by virtue of the differential unit. However, the differential lock collar 86 can move in the direction of arrow B so that dog teeth 88 engage dog teeth 89. This results in gear 73 becoming rotationally fast with the first input shaft 61 by virtue of dog teeth 88 and 89 and by virtue of splines 87. Accordingly, the differential unit 50 can be locked. Movement of the differential lock collar 86 in the direction of arrow B is achieved by fork 90 (which includes fork tines 91 see FIGS. 4 and 5) engaging in groove 92 of the lock collar 86. Fork 90 is moved in the direction of arrow B by air pressure applied via air port 93 to diaphragm 94 which causes pin 95, upon which fork 90 is mounted, to move in the direction of arrow B. In order to unlock the differential lock, air is vented from the region around diaphragm 94 via the air port 93 which results in spring 96 pushing pin 95 and hence fork 90 in the direction of arrow C of FIG. 3 thereby disengaging dog teeth 89 from dog teeth 88.

Gear 73 also includes an array of teeth 110, shown schematically in FIG. 5.

Idler gear arrangement 53 is mounted on bearings (not shown) in housing 32. The idler gear arrangement 53 rotates about axis D. The idler gear arrangement 53 has a first array of teeth 112 shown schematically on FIG. 4 and a second array of teeth 114 shown schematically on FIG. 4. The array of teeth 112 are rotationally fast with the array of teeth 114. The number of teeth in the array of teeth 112 is the same as the number of teeth in the array of teeth 114. The array of teeth 112 engage with the array of teeth 110. The array of teeth 114 engage with an array of teeth 116 (shown schematically in FIG. 4) of gear 54.

Gear 54 is secured rotationally fast via internal splines engaging external splines on input shaft 130. A threaded nut 131 secures gear 54 axially relative to input shaft 130.

The rear-rear axle assembly 13 is known in the art and includes an axle input element in the form of a drive flange 150, a right wheel output element in the form of a wheel shaft contained within axle tube 152 and a left wheel output element in the form of an axle shaft contained within axle tube 153. The rear-rear axle assembly 13 includes an axle housing 154 containing a single axle differential unit. The axle differential unit drivingly couples the drive flange 150 to the right and left wheel shafts contained within axle tubes 152 and 153. The differential unit together with a ring gear and pinion are mounted on a differential carrier 156. The differential carrier 156 is removably secured to axle housing 154 by an array of fixings, such as bolts or the like. Accordingly, the differential carrier can be removed from the axle housing 154 for servicing of the pinion, ring gear and differential etc.

The differential carrier 156 of the rear-rear axle assembly is substantially the same as the differential carrier 55 of the forward-rear axle assembly 12. The only difference between differential carrier 156 and differential carrier 55 being that differential carrier 55 has gear 54 secured to input shaft 130 via nut 131 whereas differential carrier 56 has drive flange 150 secured to an input shaft the equivalent of input shaft 130 via a nut the equivalent of threaded nut 131.

Significantly, a differential carrier which excludes either gear 54 or drive flange 150 can be assembled onto an axle housing. If a rear-rear axle is to be assembled, then subsequently drive flange 150 can be fitted. If a forward-rear axle is to be assembled then the drive unit assembly 30 and gear 54 can be fitted as will be further described below.

A prop shaft 158 is coupled at a front end to flange 41 and at a rear end to flange 150.

Prop shaft 20 and 158 include a universal joint at each end and a sliding splined joint to cater for misalignment and movement between the gear box 19 and forward-rear axle assembly 12 and also misalignment and movement between the forward-rear axle assembly 12 and rear-rear axle assembly 13.

Operation of the vehicle 10 is as follows:

The engine 18 transmits power to the gearbox 19 which in turn causes prop shaft 20 to rotate. Prop shaft 20 in turn causes flange 40 and hence input shaft 61 to rotate which, by virtue of the differential unit 50 causes gear 71 and gear 73 to rotate. Gear 73 drives the idler gear arrangement 53 which in turn drives gear 54 which turns input shaft 130. Input shaft 130 includes a pinion (not shown) which drives a ring gear (not shown) which drives a differential unit (not shown) within the forward-rear axle assembly 12 which differential unit then drives wheels 15R and 15L.

Because the differential unit 50 causes gear 71 to rotate, gear 71 in turn causes output shaft 80 to rotate together with flange 41. Rotation of flange 41 causes rotation of prop shaft 158 which causes rotation of flange 150 which causes rotation of the input shaft of the rear-rear axle assembly which in turn drives the ring gear (not shown) and differential unit (not shown) of the rear-rear axle assembly which in turn drives wheels 16R and 16L.

As will be appreciated, the rear-rear axle assembly 13 includes a single differential unit. The axle housing 56 of the forward-rear axle assembly 12 includes a single differential unit. The housing 32 of the drive unit assembly 30 includes a single differential unit 50. Accordingly, the differential unit 50 is contained in a different housing to the differential unit contained within axle housing 154.

Assembly of the axle arrangement 31 is as follows.

The differential carrier 55 is assembled together with input shaft 130, the associated ring gear (not shown), and the associated axle differential unit (not shown). At this stage gear 54 is not assembled. The differential carrier 55 is then assembled onto the axle housing 56 and the array of bolts 57 and nuts 58 are secured in place and tightened.

Separately, various components are assembled into the front portion 33 and rear portion 34 of the housing 32 including assembling the input shaft 61, the output shaft 80, the drive flange 41, the idler gear arrangement 53 and the gear 54.

This subassembly is then mounted on the forward-rear axle assembly 12 by passing holes 42 over appropriate studs 59 and by passing bolts (not shown) through holes 44 and tightening them into holes (not shown) in the axle housing 56. At this stage the gear 54 will be positioned around the end of input shaft 130 and it will then be necessary to screw threaded nut 131 onto the end of the input shaft 130 and tighten the nut. Once this has been done the cover 35 can be attached to the front portion 33 of the housing 32. Once the cover is in place the flange 40 can be slid onto the input shaft 61 and nut 60 can be threaded onto the end of input shaft 61 and tightened securely.

Either at this stage, or later, lubricant, such as oil can be added to the axle housing 154. Separately lubricant, such as oil can be added to housing 32. Significantly, the lubricant in the axle housing may be different from the lubricant in the drive unit assembly. Under some circumstances it may be advantageous to have different lubricants in the axle housing and the drive unit assembly because the axle housing includes a ring gear and pinion which require a particular type of lubricant but the drive unit assembly does not include a ring gear and pinion.

As mentioned above, the only difference between the forward-rear and the rear-rear differential carrier subassembly is that the forward-rear differential carrier subassembly includes gear 54 and the rear-rear differential carrier subassembly includes flange 150. Because this gear and flange can be secured in place as one of the last components to be fitted to the axle assembly, it is possible to have a single assembly line to provide both a rear-rear axle assembly 13 (which excludes a drive unit assembly 30) and a forward-rear axle arrangement which includes a forward-rear axle assembly 12 and a drive unit assembly 30. In particular the axle housing for a forward-rear axle assembly can be substantially the same as or identical to the axle housing for a rear-rear axle assembly. Furthermore, the differential carrier for a forwards-rear axle assembly can be substantially similar to or identical to the differential carrier for a rear-rear axle assembly. Indeed the differential carrier for a forward-rear axle assembly may be interchangeable with the differential carrier of a rear-rear axle assembly simply by changing gear 54 with flange 150.

The invention provides for a drive unit assembly that can easily convert an axle assembly into a forwards-rear axle assembly.

As will be appreciated, the axis of the input element is coincident with the axis of the first output element. The axis of the input element is parallel to the axis of the second output element. The axis of the first output element is parallel to the axis of the second output element. The axis of the second output element is coincident with the axis of the axle input element. The axis of the right wheel output element is coincident with the axis of the left wheel output element. The axis of the right wheel output element is arranged laterally relative to the axis of the input element, the axis of the first output element, the axis of the second output element and the axis of the axle input element. The axis of the left wheel output element is arranged laterally relative to the axis of the input element, the axis of the first output element, the axis of the second output element, and the axis of the axle input element.

The drive unit assembly defines a first lubricant reservoir. The axle assembly defines a second lubricant reservoir separate from the first lubricant reservoir. The rear-rear axle assembly defines a third lubricant reservoir separate from the second lubricant and separate from the first lubricant reservoir.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive unit assembly comprising:
    an input element having input coupling features;
    a first output element having output coupling features;
    a second output element; and
    a drive unit housing containing a differential unit, the differential unit drivingly coupling the input element, the first output element, and the second output element;
    wherein the input coupling features and the output coupling features are positioned externally of the drive unit housing;
    wherein the drive unit housing includes at least one mounting feature for securing the drive unit housing externally relative to an axle assembly having a differential carrier and an axle housing; and
    wherein the second output element is suitable for driving the axle assembly and wherein the differential unit is drivingly coupled to a first gear that is in meshing engagement with an idler gear arrangement that is in meshing engagement with a second gear that is drivingly coupled to the second output element, wherein the idler gear arrangement and the second gear rotate about different axes.

2. The drive unit assembly of claim 1 wherein the input element defines a first axis and the first output element is rotatable about the first axis.

3. The drive unit assembly of claim 2 wherein the second output element is rotatable about a second axis that differs from the first axis.

4. The drive unit assembly of claim 3 wherein the second axis is parallel to the first axis.

5. The drive unit assembly of claim 3 wherein the first gear is rotatable about the first axis, the idler gear arrangement is rotatable about a third axis disposed parallel to the first axis, and the second gear is rotatable about the second axis.

6. The drive unit assembly of claim 3 wherein the drive unit housing includes a mounting flange having a plurality of mounting holes defining the at least one mounting feature, each mounting hole having a mounting hole axis disposed parallel to the first axis.

7. The drive unit assembly of claim 6 wherein each mounting hole axis is spaced from the second axis by substantially a same distance.

8. The drive unit assembly of claim 6 wherein the mounting flange is positioned axially between the input element and the first output element.

9. The drive unit assembly of claim 6 wherein the drive unit housing includes a mounting bracket having one or more bracket holes defining the at least one mounting feature.

10. The drive unit assembly of claim 9 wherein each bracket hole has an axis which is not parallel to the first axis.

11. The drive unit assembly of claim 9 wherein each mounting bracket hole has an axis which lies in a plane which is perpendicular to the first axis.

12. The drive unit assembly of claim 9 wherein the mounting bracket is positioned on the drive unit housing between the mounting flange and the first output element.

13. The drive unit assembly of claim 1 wherein the differential unit is a single differential unit.

14. An axle arrangement comprising:
    a drive unit assembly having:
        an input element having input coupling features;
        a first output element having output coupling features;
        a second output element; and
        a drive unit housing containing a differential unit, the differential unit drivingly coupling the input element, the first output element, and the second output element, wherein the input coupling features and output coupling features are positioned externally of the drive unit housing and the drive unit housing includes at least one mounting feature; and
    an axle assembly having:
        an axle input element defined by a differential carrier;
        a right wheel output element;
        a left wheel output element; and
        an axle housing containing a single axle differential unit, the single axle differential unit drivingly coupling the axle input element, the right wheel output element, and the left wheel output element;
    wherein the drive unit housing is secured to the axle assembly externally relative to the axle housing via the at least one mounting feature such that the second output element selectively drives the axle input element and lubricant in the drive unit assembly is not provided to the axle assembly.

15. The axle arrangement of claim 14 wherein the input element defines a first axis, the first output element is rotatable about the first axis, the axle housing extends laterally, and the first axis extends over the axle housing.

16. A vehicle comprising:
an axle arrangement including:
  a drive unit assembly having:
    an input element having input coupling features;
    a first output element having output coupling features;
    a second output element; and
    a drive unit housing containing a differential unit, the differential unit drivingly coupling the input element, the first output element, and the second output element, wherein the input coupling features and the output coupling features are positioned externally of the drive unit housing and wherein the drive unit housing includes at least one mounting feature; and
  an axle assembly having:
    an axle input element defined by a differential carrier;
    a right wheel output element;
    a left wheel output element; and
    an axle housing containing a single axle differential unit, the single axle differential unit drivingly coupling the axle input element, the right wheel output element, and the left wheel output element, wherein the drive unit housing is secured to the axle assembly externally relative to the axle housing via the at least one mounting feature such that the second output element selectively drives the axle input element, and wherein the axle arrangement defines a forward-rear axle arrangement of the vehicle and the differential carrier defining a forward-rear differential carrier; and
  a rear-rear axle assembly positioned behind the forward-rear axle arrangement, the rear-rear axle assembly including a rear-rear differential carrier upon which is mounted a single rear-rear differential unit;
  wherein the forward-rear differential carrier is substantially the same as the rear-rear differential carrier and lubricant in the drive unit assembly is not provided to the axle assembly.

17. The vehicle of claim 16 wherein an axis of the input element is coincident with an axis of the first output element.

18. The vehicle as defined in claim 17 wherein the axis of the input element is parallel to an axis of the second output element.

19. The vehicle of claim 16 wherein an axis of the input element is parallel to an axis of the axle input element.

20. The vehicle of claim 16 wherein the drive unit assembly defines a first lubricant reservoir and the axle assembly defines a second lubricant reservoir separate from the first lubricant reservoir.

* * * * *